J. PAWOLOWSKI.
RACE COURSE BARRIER AND STARTING DEVICE.
APPLICATION FILED JULY 16, 1908.
931,956.
Patented Aug. 24, 1909.
6 SHEETS—SHEET 1.
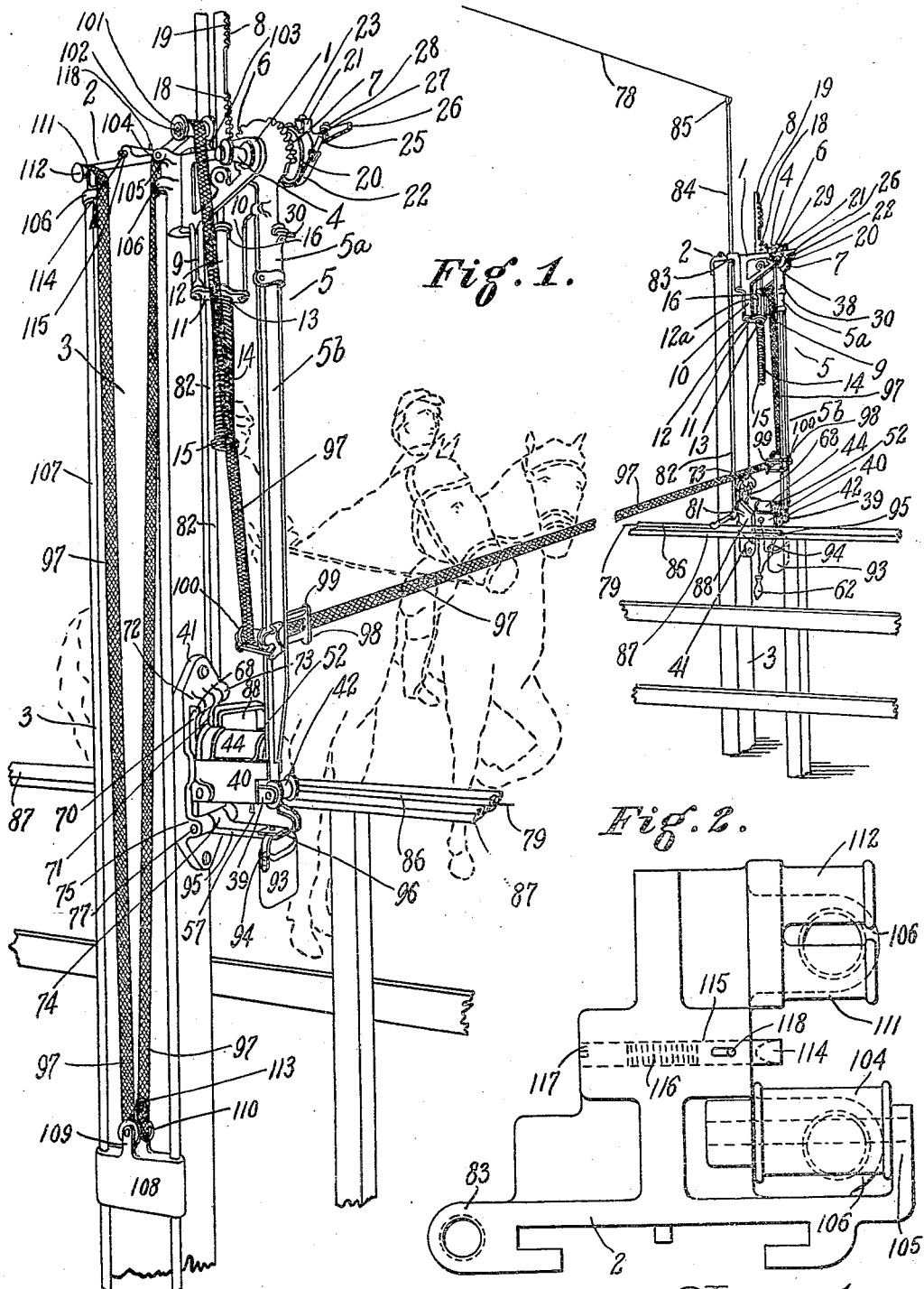
Witnesses:
Inventor
Jacob Pawolowski
By James N. Ramsey
Attorney

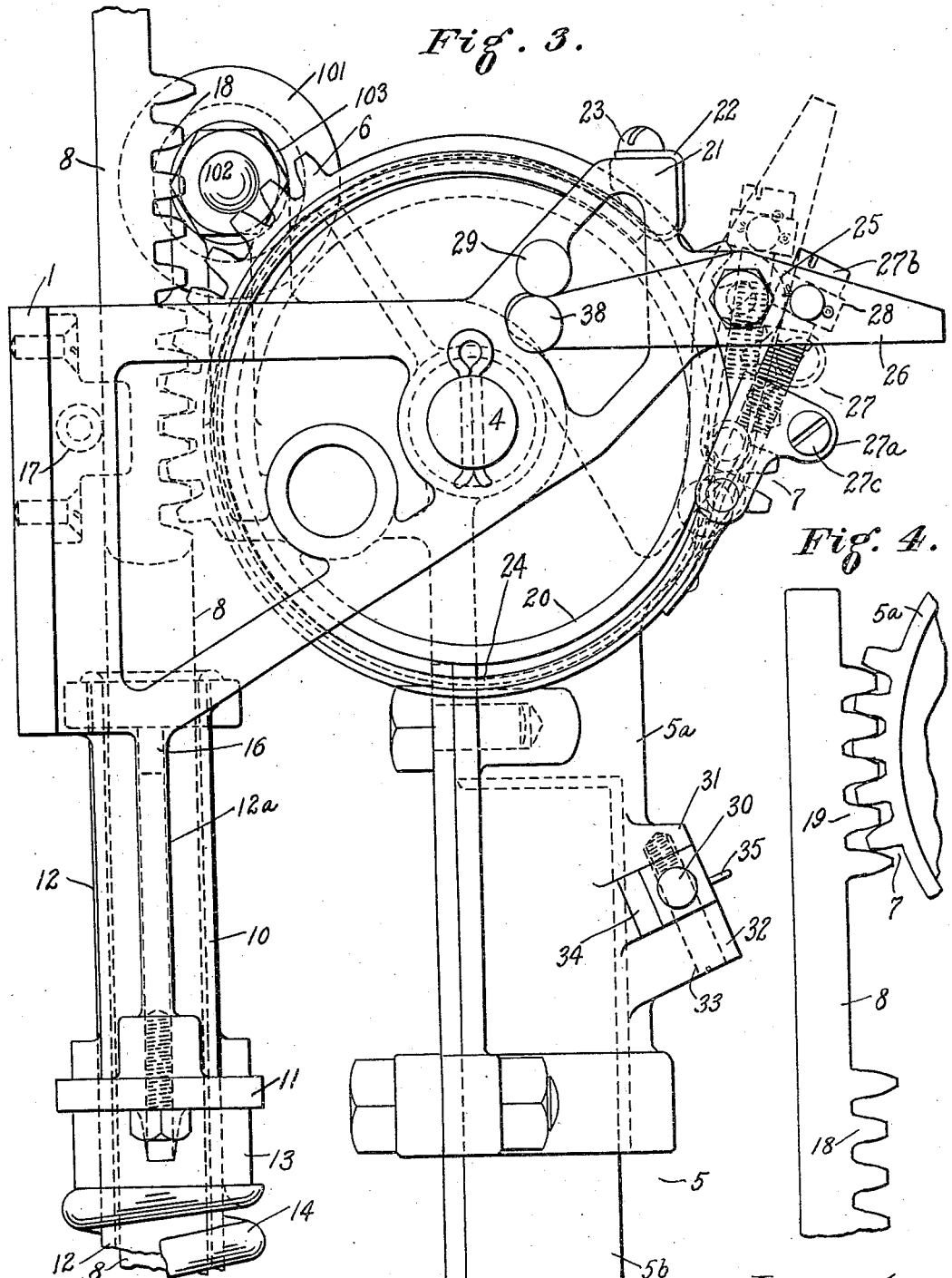

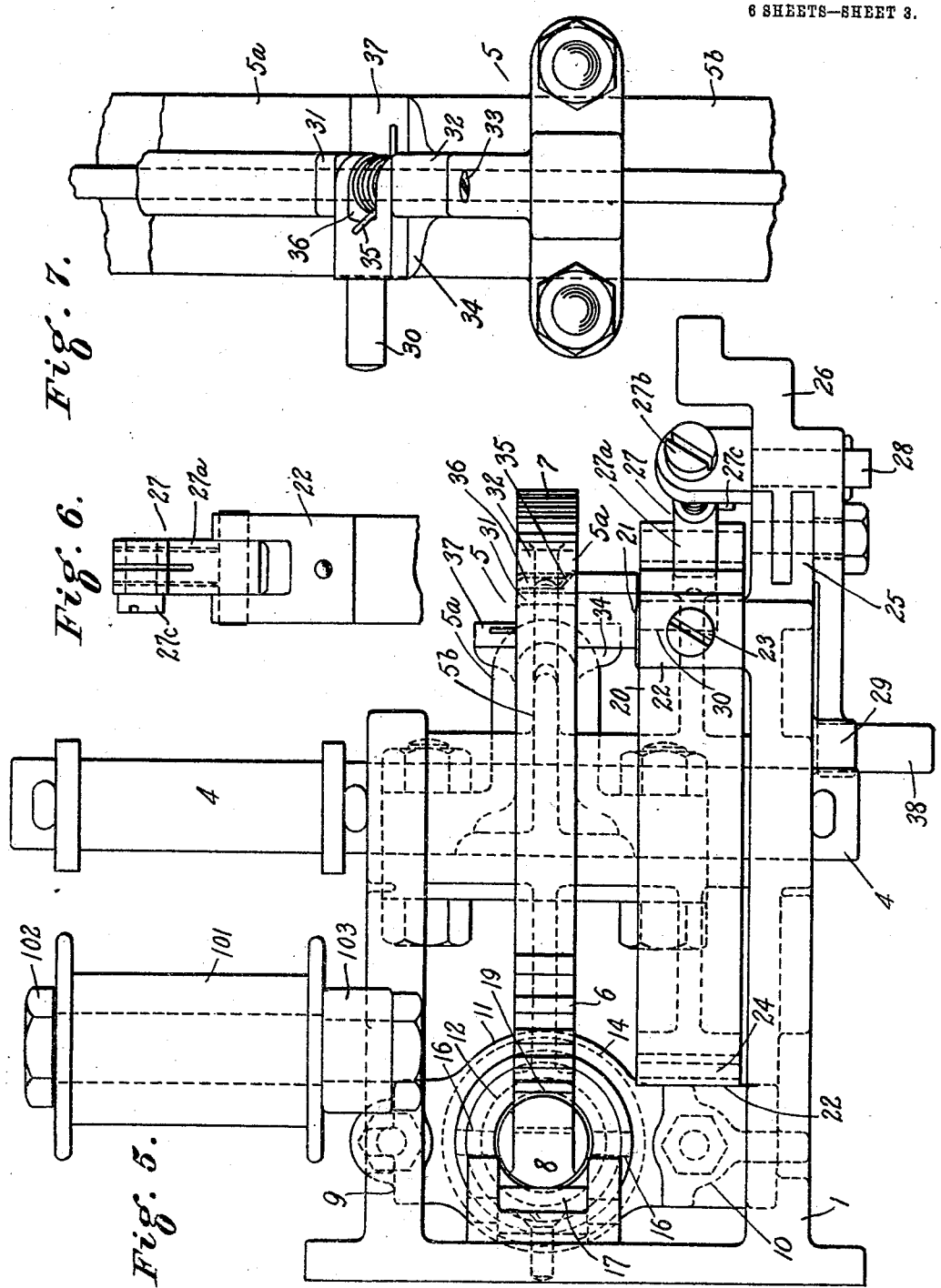

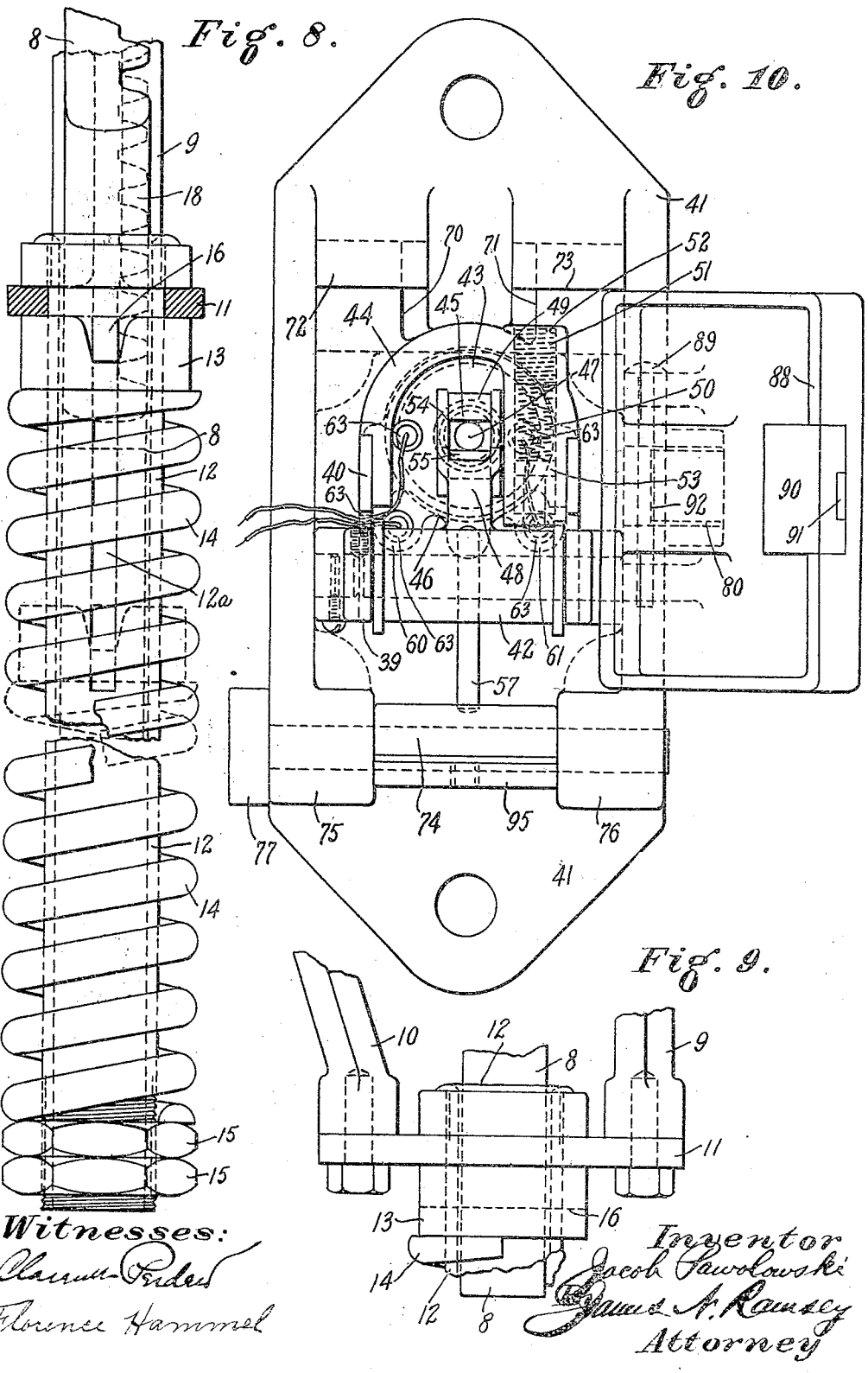

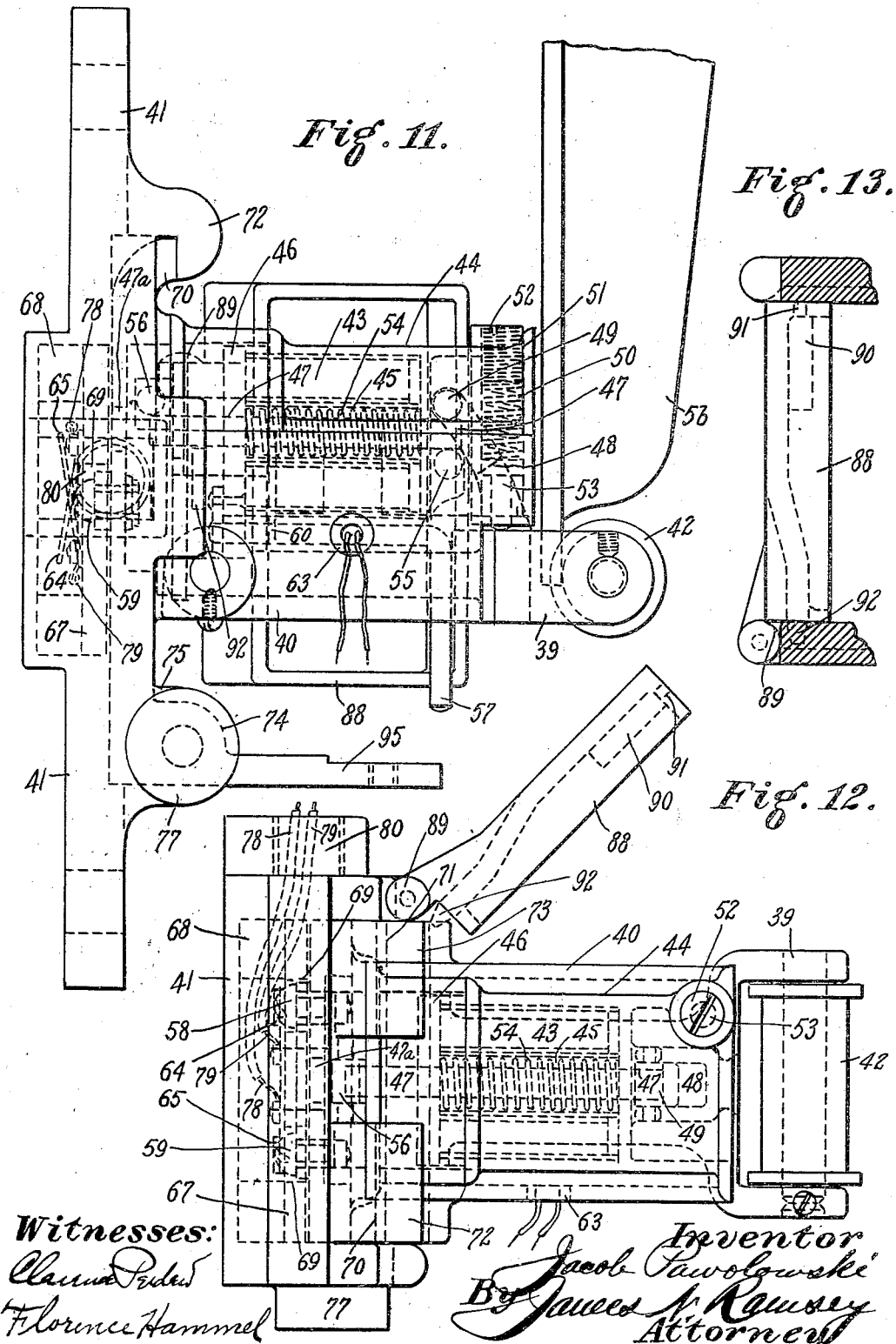

J. PAWOLOWSKI.
RACE COURSE BARRIER AND STARTING DEVICE.
APPLICATION FILED JULY 16, 1908.
931,956.
Patented Aug. 24, 1909.
6 SHEETS—SHEET 6.
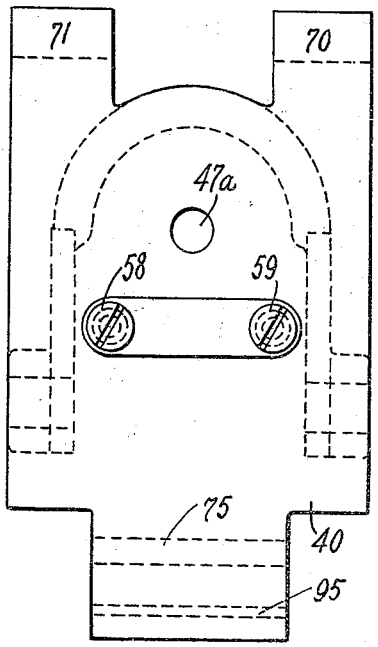
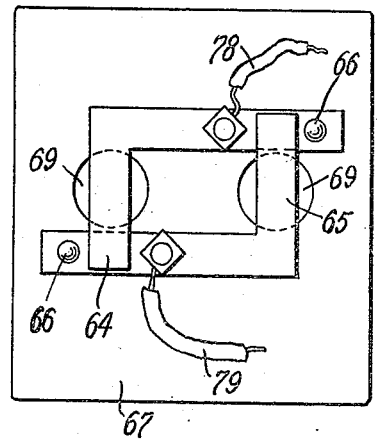
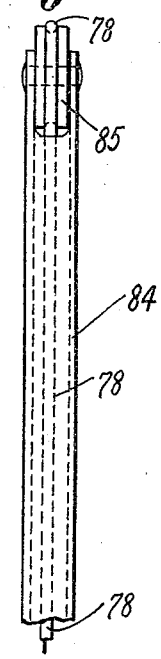
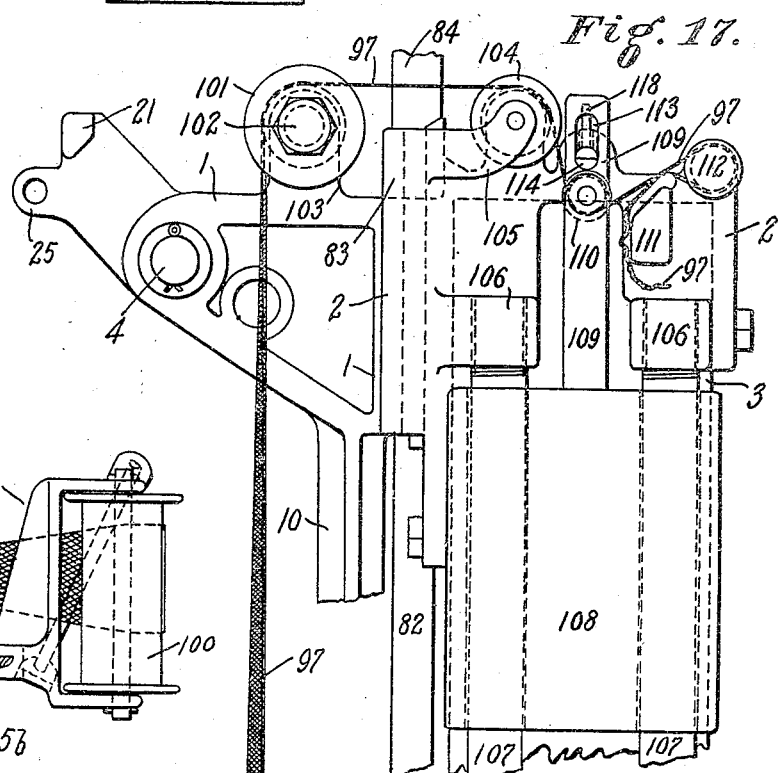
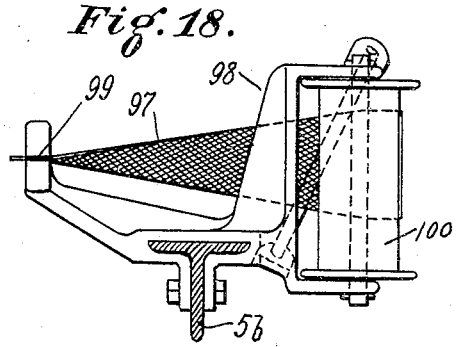
Witnesses:
Inventor
Jacob Pawolowski
By James N. Ramsey
Attorney

UNITED STATES PATENT OFFICE.

JACOB PAWOLOWSKI, OF CINCINNATI, OHIO, ASSIGNOR TO LEO HERZOG, OF CINCINNATI, OHIO.

RACE-COURSE BARRIER AND STARTING DEVICE.

931,956.      Specification of Letters Patent.      Patented Aug. 24, 1909.

Application filed July 16, 1908. Serial No. 443,927.

*To all whom it may concern:*

Be it known that I, JACOB PAWOLOWSKI, a citizen of the United States, residing at Cincinnati, in the county of Hamilton and State of Ohio, have invented certain new and useful Improvements in Race-Course Barriers and Starting Devices, of which the following is a specification.

My invention relates to means for alining the horses on the race course and for giving a signal for the starting of the horses, the object of my invention being to effect this alinement by means of a tape or barrier stretched across the course, under a fixed strain, and uniformly yieldable throughout, and to remove this tape, as a part of the signal for starting, with the least chance of interfering with the horses or riders.

My invention consists in arms adapted to support and guide the tape, and in the means for actuating the arms and the means for holding and releasing the tape, together with the parts and the details of construction and arrangements of parts, as will hereinafter be more fully described and claimed.

In the drawing: Figure 1 is a general perspective view of my invention, parts being broken away for lack of space. Fig. 2 is a plan view of one of the stirrups which support the heads. Fig. 3 is a side elevation of one of the heads and part of the arm, more clearly illustrating the construction of the arm actuating and retarding mechanism, the arm being represented as in restrained position. Fig. 4 is a side elevation of part of the rack and part of the segment, illustrating the relative positions of these parts when they are operating to retard the swinging of the arm. Fig. 5 is a plan view of the parts illustrated in Fig. 3. Fig. 6 is a detail front view of part of the friction strap and part of the adjustable link therefor. Fig. 7 is a front elevation of part of the arm, illustrating the construction of the yieldable lug thereon. Fig. 8 is a view, partly in side elevation and partly in section, illustrating the construction of the arm actuating mechanism, parts being broken away for lack of space. Fig. 9 is a front elevation of the lower part of the head and part of the arm actuating mechanism thereon. Fig. 10 is a front elevation of the restraining and releasing device and the stirrup therefor. Fig. 11 is a side elevation of the restraining and releasing device and the stirrup therefor, part of the arm being also shown. Fig. 12 is a plan view of the restraining and releasing device and the stirrup therefor. Fig. 13 is a detail view, partly in section, better illustrating the construction of the door on the stirrup for the restraining and releasing device. Fig. 14 is a rear view of the bifurcated frame which forms part of the restraining and releasing device. Fig. 15 is a rear view of the board which contains the sockets in the stirrup for the restraining and releasing device. Fig. 16 is a side elevation of the upper part of the conduit for the wire which extends across the track. Fig. 17 is a side elevation of the upper part of the post and the head and the stirrup therefor, the tape and weight being illustrated as in releasing position. Fig. 18 is a plan view of the guide for the tape on the arm, the arm being shown in section.

Constructed as illustrated, my invention comprises the head 1 removably supported in the stirrup 2, which is mounted on, and forms a cap for, the upper end of the post 3. The head 1 is of bifurcated formation, its two members being joined by the back, which is so formed as to fit accurately into the stirrup 2. In the forward part of the head the shaft 4 is mounted and passes transversely through the two members of the head. On this shaft 4 is pivotally mounted the arm 5, whereby the arm is adapted to swing in a vertical plane. This arm 5 is composed of the channeled part 5ᵃ and the part 5ᵇ, of tee shaped cross section, fitting into the channeled part 5ᵃ.

The channeled part 5ᵃ of the arm is provided with a segmental gear 6 and a segmental gear 7 concentric with the shaft 4 and of the same pitch diameter, and in the rearward part of the head, adjacent to its back, the rack 8 is vertically and slidably mounted in such position relative to the segments 6 and 7 that it is adapted to mesh or engage with them when the arm is swung on the shaft 4. The head 1 is provided with downwardly extending members 9 and 10 to which is bolted a yoke 11, and in this yoke 11 the tube 12 is vertically and slidably mounted and receives the lower end of the rack 8. This tube 12 is provided with a collar rigidly secured thereon near its upper end and this collar is adapted to engage with the yoke 11 to limit the downward movement of the tube 12. Below the yoke 11 a collar 13 is slidably mounted on the tube 12 and below this, and surrounding the tube to a point near its end, is the helical spring 14 which is held on the tube by means of the lock nuts 15. The collar 13 has recesses opening upwardly and radially opposite to each other, and the tube has elongated slots 12$^a$ radially opposite to each other. Passing through the lower end of the rack 8 and projecting through the slots 12$^a$ in the tube 12 is the pin 16 which engages within the recesses in the collar 13. Preferably a roller 17 is journaled in suitable blocks mounted on the back of the head 1 and forms a bearing for supporting and guiding the upper part of the rack in its vertical movement. This rack 8 is provided with one series of teeth 18 to mesh with the segmental gear 6 on the arm and with another series of teeth 19 to mesh with the segmental gear 7 on the arm; the uppermost tooth of the series 18 and the lowermost tooth of the series 19 are preferably somewhat longer than the other teeth.

Each series of teeth is so positioned on the rack 8 that, when the arm 5 is drawn down into vertical position, the rack 8 will be raised by the engagement of the segmental gear 6 with the series of teeth 18 and compress the helical spring 14 between the lock nuts 15 and the collar 13. Due to this compression of the spring 14, the arm will have a tendency to swing upward. Then, when the arm is swung upwardly, due to the action of the compressed helical spring 14, the segmental gear 7 will engage with the series of teeth 19, upon which the rack 8 will be forced downward, carrying the collar 13 with it, due to the engagement of the pin 16 with collar, again compressing the helical spring 14; thus the helical spring 14 serves alternately to actuate the arm and to retard it.

The brake drum 20 is mounted on the shaft 4, concentric with the segmental gears on the arm and between the members of the head and this brake drum is rigidly secured to the arm so that it will rotate with the arm. The member of the head 1 adjacent to the brake drum is provided with a lug 21 extending transversely over the periphery of the brake drum 20. A friction strap 22 is rigidly secured to the lug 21 by hooking it thereover and by inserting a screw 23 through the strap into the lug. This friction strap 22 extends around the greater part of the periphery of the brake drum 20 and is preferably provided, on its side adjacent to the periphery of the brake drum 20, with a lining 24, of leather or similar material, adapted to make efficient frictional contact with said periphery. The member of the head adjacent to the brake drum is also provided with a forwardly projecting lug 25, on which is pivotally mounted the brake lever 26, and this brake lever 26 has pivotally connected to it, forwardly of its pivotal mounting on the lug 25, an adjustable link 27, which is also pivoted to the free end of the friction strap 22. This adjustable link 27 comprises a body 27$^a$, which is pivoted to the end of the friction strap 22 and receives the screw 27$^b$ adapted to be adjusted therein and clamped in position therein by means of the screw 27$^c$, the body 27$^a$ being slotted where the screw 27$^b$ enters it, so that its two members thus formed are movable relatively to each other and may be drawn together by the screw 27$^c$ to clamp the screw 27$^b$. This screw 27$^b$ takes through a rotatable stud 28 in the brake lever 26, by means of which the pivotal connection between the link and the brake lever is formed. A lug 29 is formed on the outer side of the head 1 in such position as to be engaged by the inner or rear end of the brake lever 26, and limit the upward movement of that end of the brake lever, and consequently limit the downward movement of the outer or forward end of the brake lever, thus controlling the distance through which the friction strap 22 may move away from the periphery of the brake drum 20. It will be noted from the above description that when the outer end of the brake lever 26 is raised in drawing the friction strap 22 tightly around the periphery of the brake drum 20, the end of the friction strap 22 being held stationary, the friction strap will clamp the drum to prevent its rotation and will act as a brake on the drum and on the arm which is rigidly secured to the drum.

For actuating the brake lever 26 a movable lug 30 is pivotally mounted on the channeled part 5$^a$ of the arm, between the lugs 31 and 32 thereon, by means of the pin 33 passing through the lugs. A bracket 34 is provided adjacent to the lug 30 to limit its movement in one direction, and is in such position that when the lug lies against it the lug will extend substantially at right angles to the length of the arm. A helical spring 35 is wound around the pin 33, inside a recess 36 in the lug 30, and has one end bearing on the lug 30, while its other end bears on a bracket 37 on the side of the arm opposite from that on which the lug 34 is located. This spring normally holds the lug 30 against the bracket 34 but allows the lug 30 to yield away from the bracket 34. Thus constructed when the arm swings upward the lug 30 will engage with the brake lever 26, which is preferably peculiarly shaped, as shown, so that its forward end lies within the path described by the lug 30, which, being rigid, due to its lying against the bracket 34, will raise the outer or forward end of the brake lever 26 and draw the friction strap 22 tightly around the periphery of the brake drum 20, as above described. Thus the arm is caused to actuate the brake for stopping its swinging. When the friction strap is thus tightly drawn around the brake drum 20 it will remain in that position, due to its frictional engagement with the brake drum, and for the purpose of releasing the friction strap from the brake drum, the inner or rear end of the brake lever is provided with a suitable lug or handle 38, by means of which said inner end may be manually drawn upward, forcing the outer or forward end downward. The inner end of the brake lever is thus drawn upward until the brake lever again engages with the lug 29 on the head, and, in this position, the outer or forward end of the brake lever will again be in the path of the lug 30 on the arm. It is for the purpose of allowing the lug 30 to pass the brake lever 26 on its downward movement that the lug is pivotally mounted and provided with the helical spring 35, allowing it to yield away from the bracket 34 as above described.

The lower end of the tee shaped part $5^b$ of the arm is flat, and an arm restraining frame 39 is mounted to swing vertically in a bifurcated frame 40, which, in turn, is removably secured in a stirrup 41 on the post 3. This arm restraining frame is provided with a horizontally journaled roller 42, with which the flat lower end of the part $5^b$ of the arm is adapted to engage when the arm restraining frame 39 is held in substantially horizontal position, to restrain the arm 5 from swinging upward.

An electro-magnet 43 is mounted in a suitable housing 44, also mounted in the bifurcated frame and held stationary therein, and this electro-magnet has a hollow core 45. An armature 46 is provided for the electro-magnet 43 at its rear end, and a rod 47, forming a projection on the armature, extends through the hollow core of the magnet 43 and out past its forward end. The arm restraining frame 39 has an upwardly, and preferably rearwardly, extending lug or projection 48 of bifurcated formation, between the members of which is journaled a roller 49. The parts are so proportioned that, when the arm restraining frame 39 is held in substantially horizontal position to restrain the arm 5 from swinging upward, and when the armature 46 is held forward adjacent to the electro-magnet 43 by the attraction of said electro-magnet, the forward end of the rod or projection 47 is extended under the roller 49 of the upwardly extending lug 48 on the frame 39, to maintain said frame in such substantially horizontal position. The helical spring 50 is mounted in a vertically extending and upwardly opening socket 51, in the housing 44, near its forward end, and to one side thereof, and is confined between a screw plug 52, fitting into the upper part of the socket 51, and the plunger 53 in the lower part of the socket 51, which plunger 53 extends downwardly through an opening in the lower end of the socket 51. The plunger 53 and helical spring 50 are so adjusted in the socket 51, by means of the screw plug 52, that when the arm restraining frame 39 occupies the substantially horizontal position above described, it will engage with the plunger 53, slightly raising it and compressing the helical spring 50 between the plunger 53 and the screw plug 51. Then the armature 46 being held adjacent to the electro-magnet 43, due to the passage of an electric current through the coils of the electro-magnet, if this current is interrupted the attraction of the electro-magnet for the armature will cease and a helical spring 54, which surrounds the rod 47 within the hollow core 45 of the electro-magnet, will force the armature 46 and the rod or projection 47 backward, withdrawing the forward end of the rod or projection 47 from under the roller 49 of the upwardly extending lug or projection 48 on the arm restraining frame 39. Then the helical spring 50, due to its being compressed by the upward pressure of the plunger 48, will act to force this plunger 48 downward, which, due to its engagement with the arm restraining frame 39, will act to force the arm restraining frame 39 quickly downward, drawing the roller 42 downward away from the flat end of the tee shaped part $5^b$ of the arm. Thus the arm will be released and will be swung upward by the arm actuating mechanism consisting in the rack 8, the segment 6 and the helical spring 14, and their auxiliary parts.

Preferably the rod or projection 47 of the armature 46 is provided with a roller bearing 55 under its forward end and with a roller bearing 56 over its rearward end to resist the pressure of the roller 49 of the arm restraining frame 39 and decrease the friction due thereto. These roller bearings 55 and 56 are mounted in projections on the housing 44. An opening $47^a$ is provided in the back of the bifurcated frame 40 for the passage of the projection 47.

For manually returning the armature 46 to its position adjacent to the electro-magnet 43, a suitable forwardly and downwardly extending handle 57 is secured on the lower part of said armature, the downwardly extending handle 57 extending through a slot in the arm restraining frame 39.

It is obvious that by electrically connecting in series the electro-magnets of the mechanisms hereinbefore described, each one being on the opposite side of the race course from the other, the interruption of the electric current will cause the arms 5 of both of the mechanisms to be released simultaneously. The bifurcated frame 40 is provided with two studs 58 and 59 mounted in the back of said bifurcated frame and insulated from each other. The wire forming the coils of the electro-magnet 43 passes through openings in the forward wall of the housing 44, and backward, preferably through openings in downwardly extending lugs 60 and 61 on the housing 44, which are provided for the purpose of keeping the wires out of the way of the arm restraining frame 39 and the armature 46. The ends of the wire thus passing backward are electrically connected to the studs 58 and 59, which thus form the terminals of the coils of the electro-magnet. However, on one of the mechanisms on one side of the track, a suitable push button switch 62 is provided and is cut into one of the wires above described as passing backward to the studs 58 and 59. It is the mechanism intended to be thus provided with the switch 62 that is illustrated in Figs. 10, 11 and 12 of the drawings, where, as will be noted, the part of the wire which passes backwardly from the electro-magnet to the stud 59 first passes laterally outwardly of the bifurcated frame 40 through an opening in the side thereof, to be cut for the insertion of the switch 62 into the circuit. The openings in the housing and in the frame above referred to are preferably provided with suitable insulating bushings 63.

For making contact with the studs 58 and 59, respectively, on the back of the bifurcated frame 40, the stirrup 41 is provided with a pair of tongues 64 and 65. Each one of these tongues is secured through its end part, by means of a rivet 66, to a board 67 which fits into a recess 68 in the stirrup 41. Near the free end of each of the tongues 64 and 65, this board 67 is provided with a socket 69. These sockets 69 are in such a position that when the bifurcated frame 40 is placed in position in the stirrup 41, the studs 58 and 59 will make efficient electric contact with the springs 64 and 65, respectively, through the sockets. The bifurcated frame 40 is thus placed in position in the stirrup 41 by passing its upwardly extending lugs 70 and 71 behind the downwardly extending lugs 72 and 73 respectively on the stirrup 41, upon which its lower end, which lower end is provided with a lug 74 having a transversely extending opening, will come between the two lugs 75 and 76 on the stirrup 41, which also has transversely extending openings adapted to come into alinement with the transversely extending opening in the lug 74 on the bifurcated frame 40. Through the transverse openings thus brought into alinement, a pin 77 passes so that the bifurcated frame 40 is held firmly in position with its studs 58 and 59 in electrical contact with the lugs 64 and 65, respectively.

The tongues 64 and 65 are so shaped that when the studs 58 and 59, respectively, are not in engagement with them, the tongues are in electrical contact with each other but when the studs do engage with them they are separated and the electrical contact between the tongues is broken. An arrangement of this kind is necessary where it is desired to provide for the setting up of the mechanisms at any one of various points around the race course, in which case, posts 3, provided with the stirrups 2 and stirrups 41, hereinbefore described, would be located at each of the points, ready for the application of the heads 1 and of the bifurcated frames 40, with the mechanisms which they support. In view of this, and since it is desirable to maintain only one circuit on the race course, the automatic closing of the circuit upon the removal of a bifurcated frame 40 from a stirrup 41 on any of the posts is necessary, as above stated. For thus establishing a single continuous circuit extending to a number of different stirrups 41, on as many different posts, at various points around the track, I connect the wires 78 and 79 to the tongues 64 and 65, respectively, and carry these wires laterally through an opening 80 in the side of the recess 68 in the stirrup 41. Here, preferably, a tee shaped connection 81 is provided, from which leads upwardly, along the front of the post 3, a pipe or conduit 82. The upper end of this pipe or conduit 82 enters a suitable socket in a laterally extending lug 83 on the stirrup 2 at the top of the post 3, and in another socket in the upper side of this lug 83, another pipe or conduit 84 is inserted, so as to be continuous with the conduit 82. The upper end of this conduit 84 is bifurcated and forms a support for an insulator 85. The wire 78 above mentioned as being connected to the lug 64, after passing laterally from the recess 68 in the stirrup 41, passes upwardly through the conduits 82 and 84 and over the insulator 85 and across to the corresponding insulator 85 and down through the corresponding conduit 84 to the mechanism on the opposite side of the race course. The other wire 79, above mentioned as being connected to the tongue 65, passes through a conduit 86, secured in the remaining branch of the tee shaped connection 81. This conduit 86 extends, preferably, along the top of the rail 87 to the stirrup 41 on the next post 3 around the race course.

From the above it will be noted that with the wires 78 extending across the race course, between each pair of stirrups 41 at each point therearound, and with the wire 79 extending between the adjacent stirrups 41 on each side of the race course, therearound, and with the tongues 64 and 65 in each stirrup 41 making electrical contact, a continuous electric circuit may be formed into which may be inserted, at any point around the track, coils of the electro-magnets 43, and the switch 62. Thus, with a suitable current generator, of any well known construction, also introduced into the circuit, a pair of magnets may be introduced at any point around the track with the greatest facility and their simultaneous operation accomplished with the greatest efficiency.

It is desirable to leave the board 67 with its tongues 64 and 65 in the recess 68 of the stirrup 41, when the other parts are removed. In order to prevent tampering with these parts, the stirrup 40 is provided with a hinged door 88 for closing the recess 68. This door 88 is hinged on pins 89 extending through lugs on the door and on the stirrup, and the door is provided with a suitable lock 90 having the bolt 91 which enters a recess in the stirrup. In order to provide against withdrawing of the door, regardless of the lock, by merely withdrawing the pin 89 upon which it is hinged, I provide the door 90 with a lug 92, adjacent to the hinge, which enters a recess in the stirrup in a manner similar to that in which the bolt 91 of the lock 90 enters its recess in the stirrup. This construction is best illustrated in Fig. 13 in the drawings.

For furnishing a current generator in convenient portable form for the circuit above described, I prefer to provide a case 93 in which the battery may be carried and through the side of which the wires may lead from the battery to be cut into the circuit in the same manner as is the push button 62. This case 93 is provided with a strap handle 94, and the bifurcated frame is provided with a forward extension 95 over which the strap handle 94 is passed and held thereon by a plate 96, screwed to the forward extension. It is obvious that each of the mechanisms may thus be provided with batteries as illustrated in Fig. 1 of the drawings, or the battery may be located upon only one of the mechanisms.

The barrier tape 97 is supported across the track between the arms 5 by providing a barrier guide 98 on the part 5ᵇ of each arm 5, which has a vertical slot 99 through which the tape is passed. Thus passing through the vertical slot 99, the tape is held so that it presents its flat side toward the horses where it extends across the track, and the barrier guides 98 are preferably so located on the arms 5 that the tape will pass across the track at about the height of the noses of the horses, where it will be visible to them. The vertical slot 99 in the barrier guide 98 is located on the side of the arm 5 adjacent to the track, and on the other side of the arm 5, away from the track, the barrier guide 98 is provided with a roller 100, journaled horizontally therein. After passing through the vertical slot 99, the tape 97 passes under the roller 100 and upward over a roller or sheave 101 journaled horizontally on a stud 102, which is mounted in an upwardly extending lug 103 on the head 1. After passing over the sheave 101 the tape passes to the rear and slightly downwardly over another roller or sheave 104, journaled horizontally in an extension 105 on the stirrup 2. This stirrup 2 is also provided with a pair of lugs 106, on a level with each other slightly below the extension 105, to receive the upper ends of the vertical guides 107, which guides extend down along the side of the post 3 to the ground. A weight 108 is mounted to slide on these vertical guides 107, and is provided with upward extensions 109 between which is horizontally journaled a roller 110. The tape 97, after passing over the sheave 104, passes downwardly under the roller 110 on the weight 108, and then upwardly to the top of the post 3 over a stud 111 having an upper surface inclined forwardly and downwardly, and over a rounded stud 112, which is located slightly above and to the rear of the stud 111. The tape 97 passes around this rounded stud 112 and over the stud 111 again between it and the part of the tape which first passed over it, so that when the weight 108 is suspended on the part of the tape between the sheave 104 and the studs 111 and 112, the part of the tape which first passed over the stud 111 will bear on the part which latterly passes over it and clamp it against said stud. With this construction provided on the mechanisms on both sides of the track, it will be seen that the tension of the tape will be maintained, and its frictional fastening on the studs 111 and 112 will be maintained, due to the suspension of the weight 108 on the tape. It will also be seen that if part of the tape passing across the track is borne upon too strongly, such as by the encroachment of a horse past the line of the barrier, the tape will be drawn out through the slot 99 and around the roller 100 in the barrier guide 98, raising the weight 108 along its vertical guides 107. Then if this drawing out of the tape occurs to such an extent that the weight 108 rises along its vertical guides 107 until its roller 110 passes slightly above the level of the stud 111, the tape will be passed away from said stud 111, releasing the part of the tape which is clamped against the stud 111, destroying the frictional fastening of the tape on the studs, and releasing the tape, to guard against its breakage.

With the tape mounted on the sheaves 101 and 104, as above described, it will be liable to be displaced from its sheaves when the arm is swung to its extreme upward position. In order to guard against this, an extension is provided on the head 1 by continuing the shaft 4 laterally past the line of the tape 97 so that when the arm swings upward the tape will make contact with the under side of this extension, formed by the continuation of the shaft 4, and form a turn under it, so that its position relative to the studs 101 and 104 will be unchanged. Preferably the extension formed by the shaft 4 as well as the sheaves 101 and 104 are provided with flanges to prevent the lateral displacement of the tape therefrom. For the same reason, I prefer to provide the roller 100, on the barrier guide 98, and the roller 110, on the weight 108, also with flanges.

When the weight 108 is raised to the extent that it allows the frictional fastening of the tape on the studs 111 and 112 to be destroyed, it is desirable that it be supported in such raised position when the support of the tape is thus removed. For this purpose, I make the extension 109, of the weight, which is adjacent to the post 3, somewhat longer than the other one, so that it extends above the roller 110 and provide this lengthened extension with a recess 113. The stirrup 2 is provided with a bolt 114, which has a beveled end, and which slides laterally in a recess 115 in the stirrup. This bolt 114 is adapted to enter the recess 113 in the extension 109 on the weight 108, when the weight 108 rises to the position in which it allows the frictional fastening of the tape on the studs 111 and 112 to be destroyed. For the purpose of causing this bolt 114 to automatically enter the recess 113, a helical spring 116 is mounted in the recess 115 behind the bolt, and a screw plug 117 is inserted in the recess for holding the helical spring 116 in position and for adjusting its pressure on the bolt 114. The bolt 114 is also provided with an upwardly extending stud 118, passing through a slot, to release the weight when renewing the attachment of the tape.

The tape, as above described, has its tension maintained by the constant action of the weights, while the releasing of the tape is effective and does not involve the rapid movement of any metallic or any hard object liable to do injury to horses, or riders or bystanders, as is the case in certain heretofore described mechanisms.

When the tape is violently thrown upward it is necessary to provide a mechanism with some form of cushioning apparatus to relieve the strain on the tape as well as on the mechanism. This function has been provided for, in apparatus heretofore described, by making part of the arm resilient. Such construction is avoided, and the arm allowed to be made rigid, by causing the arm actuating mechanism to also act as an arm retarding or cushioning mechanism as hereinbefore described. This, together with the various details of construction hereinbefore set forth, results in increased simplicity in construction and efficiency in operation.

Having fully described my invention, what I claim as new and desire to secure by Letters Patent is:

1. In a race course barrier and starting device, arms, a tape supported and guided by said arms, heads in which said arms are pivotally supported, a segmental gear on each arm, a rack slidably mounted in each head and adapted to engage with the segmental gear on each arm, a spring on each rack adapted to cause it to actuate the arm, a segmental gear on the arm adapted to engage with the rack to retard the movement of the arm, said spring being adapted to resist the movement of the rack when the segmental gear engages with the rack to retard the movement of the arm, substantially as and for the purposes specified.

2. In a race course barrier and starting device, arms, heads in which said arms are pivotally supported, means for swinging said arms, a tape supported and guided by said arms, sheaves over which the tape passes, weights supported by the tape, movable thereon and adapted to stretch it, and studs for securing the ends of the tape in such relative position to the sheaves over which the tape passes that the weight may be moved into position for allowing the release of the tape from said studs, substantially as and for the purposes specified.

3. In a race course barrier and starting device, arms, heads in which said arms are pivotally supported, a segmental gear on each arm, a rack slidably mounted in each head and adapted to engage with the segmental gear on each arm, a spring on each rack adapted to cause it to actuate the arm, a segmental gear on the arm adapted to engage with the rack to retard the movement of the arm, said spring being adapted to resist the movement of the rack when the segmental gear engages with the rack to retard the movement of the arm, a tape supported and guided by said arms, sheaves over which the tape passes, weights supported by the tape, movable thereon and adapted to stretch it, and studs for securing the ends of the tape in such relative position to the sheaves over which the tape passes that the weights may be moved into position for allowing the release of the ends of the tape from said studs, substantially as and for the purposes specified.

4. In a race course barrier and starting device, arms, a tape supported and guided by said arms, heads in which said arms are pivotally supported, means for swinging said arms, and clutches operated by the movement of said arms to stop the swinging of the arms, substantially as and for the purposes specified.

5. In a race course barrier and starting device, arms, heads in which said arms are pivotally supported, posts, stirrups on said posts in which said heads are removably supported, means for swinging said arms and means for stopping the swinging of said arms, sheaves on the heads and sheaves on the stirrups, a tape passing over said sheaves, guides for said tape on said arms, studs on said stirrups for frictionally securing said tape near its ends, weights movably suspended on said tape between the sheaves and the studs, adapted, when so suspended, to maintain the tension of the tape between the arms, and to maintain the frictional fastening of the tape on the studs, and adapted to be raised by the tape to release said tape from the studs, substantially as and for the purposes specified.

6. In a race course barrier and starting device, arms, heads in which said arms are pivotally supported, posts, stirrups on said posts in which said heads are removably supported, means for swinging said arms and means for stopping the swinging of said arms, sheaves on the heads and sheaves on the stirrups, a tape passing over said sheaves, guides for the tape on said arms, studs on said stirrups, on which said tape is frictionally fastened near its ends, weights movably suspended on the tape between the sheaves and the studs, and adapted to maintain the tension of the tape between the arms and to maintain the frictional fastening of the tape on the studs, and to be raised by the tape to release the tape from the studs, upward extensions on said weights, provided with detents, and slidable bolts on said stirrups, adapted to enter the detents when the weights are raised to release the tape, substantially as and for the purpose specified.

7. In a race course barrier and starting device, arms, heads in which said arms are pivotally supported, means for swinging said arms and means for stopping the swinging of said arms, posts on which the heads are mounted, sheaves on the heads above the pivotal supports of said arms, sheaves mounted on the posts, a tape passing over the sheaves on the heads and the sheaves on the posts, studs mounted on the posts, to which the tape is frictionally fastened near its ends, weights movably suspended on the tape between the studs and the sheaves which are mounted on the posts, said weight being adapted to maintain the tension of the tape and to maintain the frictional fastening of the tape on the studs, guides for the tape on said arms, and projections on the heads adapted to be engaged by the tape, whereby the tension and frictional fastening of the tape are maintained when the arms swing upward, substantially as and for the purposes specified.

8. In a race course barrier and starting device, arms, heads in which the arms are pivotally supported, means for swinging the arms, sheaves, a tape passing over the sheaves and supported and guided by said arms, studs to which the tape is frictionally fastened near its ends, weights movably suspended on the tape between the studs, adapted to maintain the tension of the tape and to maintain its frictional fastening on the studs, vertical guides for the weights whereby the weights may be guided between the sheaves and the studs to release the frictional fastening of the tape on the studs, engaging means adapted to hold the weight when the frictional fastening of the tape is released and means for releasing the engaging means from the weight, substantially as and for the purposes specified.

9. In a race course barrier and starting device, arms, heads in which said arms are pivotally supported, a segmental gear on each arm, a rack mounted to slide vertically in each head and adapted to engage with the segmental gear on each arm, tubes mounted to slide vertically in the heads and receiving the racks to slide vertically therein, helical springs surrounding the tubes below the heads, means for holding the helical springs upward on the tubes, means for holding the tubes upward in the heads, collars on the tubes, interposed between the helical springs and the heads, projections on the racks adapted to engage with the collars to move the collars downward away from the heads, against the pressure of the spiral springs, the tubes having slots through which said projections extend and in which they slide, said helical springs being adapted to be compressed by the raising of the racks when the arms are depressed by the engagement of the segmental gears with the racks, and segmental gears on the arms adapted to engage with the racks to retard the movement of the arms, the spiral springs being adapted to be compressed by the collars when the racks are depressed by the engagement of the segmental gears therewith to retard the movement of the arms, substantially as and for the purposes specified.

10. In a race course barrier and starting device, arms, a tape supported and guided by said arms, heads in which said arms are pivotally supported, means for swinging said arms, brake drums rigidly secured to said arms concentric therewith and adapted to rotate on the swinging of the arms, friction straps, each rigidly secured by one end to the head and each passing around one of the brake drums, brake levers pivotally mounted on the heads, links pivotally connecting the other ends of the frictional straps to the brake levers, and lugs on the arms adapted to engage with the brake levers, substantially as and for the purposes specified.

11. In a race course barrier and starting device, arms, a tape supported and guided by said arms, heads in which said arms are pivotally supported, means for swinging said arms, brake drums rigidly secured to said arms concentric therewith and adapted to rotate on the swinging of the arms, friction straps each rigidly secured by one end to the head and passing around one of the brake drums, brake levers pivotally mounted on the heads, links pivotally connecting the other ends of the frictional straps to the brake levers, lugs on the heads with which the brake levers are adapted to engage to limit their movement in the direction to release the friction straps from the brake drums, and lugs on the arms adapted to engage with the brake levers, said lugs being yieldable to pass the brake levers when the arms are moved downward past the brake levers, but being rigid, to move said brake levers to engage the friction straps with the brake drums, when the arms are moved upward past the brake levers, substantially as and for the purposes specified.

12. In a race course barrier and starting device, arms, heads in which said arms are pivotally supported, posts, stirrups on said posts in which said heads are removably supported, means for swinging said arms and means for stopping the swinging of said arms, sheaves on the heads, stirrups mounted on the posts below the heads, bifurcated frames removably supported in said stirrups, electro-magnets mounted in the bifurcated frames, armatures for said electro-magnets, projections on said armatures, arm restraining frames pivotally mounted in the bifurcated frames, projections on the arm restraining frames adapted to engage with the projections on the armatures to hold the frames in position for restraining the arms, springs opposing the attraction of the electro-magnets on the armatures, means for introducing and controlling an electric current through the electro-magnet, whereby said arms may be swung simultaneously, sheaves on the heads and sheaves on the stirrups in which the heads are removably supported, a tape passing over said sheaves, guides for said tape on said arms each comprising a frame and a roller rotatably mounted therein, each frame having a slot extending at right angles to the axis of the roller in the frame and the tape passing around the rollers and through the slots in the frames, said slots being adapted to occupy substantially vertical positions when said arms are restrained by means of said arm restraining frames, studs on the stirrups in which the heads are removably supported, for frictionally securing said tape near its ends, weights movably suspended on said tape between the sheaves and the studs adapted, when so suspended, to maintain the tension of the tape between the slots in the guides on the arms, and to maintain the frictional fastening of the tape on the studs, and adapted to be raised by the tape to release it from the studs, vertical guides for the weights adjacent to the posts, whereby the weights may be guided between the sheaves of the studs to release the frictional fastening of the tape on the studs, upward extensions on said weights provided with detents, and slidable bolts on the stirrups in which the heads are removably supported, adapted to enter the detents when the weights are raised to release the tape, substantially as and for the purposes specified.

13. In a race course barrier and starting device, pivotally mounted arms, means for swinging said arms, a tape supported and guided by said arms, means for stretching said tape, electro-magnets having hollow cores, armatures for said electro-magnets, projections on said armatures extending through the hollow cores of the electro-magnets, helical springs within the cores of the electro-magnets surrounding the projections on the armatures and adapted to oppose the attraction of the electro-magnets on the armatures, means for introducing and controlling an electric current through the electro-magnets, pivotally mounted arm restraining frames, projections on said frames adapted to engage with the projections on the armatures to hold the frames in position for restraining the arms, said projections being adapted to be withdrawn from engagement with the projections on the frames by the pressure of the helical springs, and being held in position for engagement by the attraction of said electro-magnets on said armatures, due to the passage of the electric current through the electro-magnets, and springs adapted to actuate the arm restraining frames upon the withdrawal of the projections from engagement when the electric current is interrupted, whereby said arms may be simultaneously released by the arm restraining frames, substantially as and for the purposes specified.

14. In a race course barrier and starting device, arms, heads in which said arms are pivotally supported, posts, stirrups on said posts in which said heads are removably supported, means for swinging said arms and means for stopping the swinging of said arms, a tape supported and guided by said arms, means for stretching said tape, stirrups on the posts below said heads, bifurcated frames removably supported in the stirrups, electro-magnets mounted in the bifurcated frames, armatures for said electro-magnets, projections on said armatures, arm restraining frames pivotally mounted in the bifurcated frames, projections on the arm restraining frames adapted to engage with the projections on the armatures to hold the frames in position for restraining the arms, springs opposing the attraction of the electro-magnets on the armatures, wires forming the coils of the electro-magnets, studs forming the termini of the wires, mounted in the bifurcated frames and insulated from each other, sockets in the stirrups in which the bifurcated frames are removably supported, and tongues in the stirrups, adjacent to the sockets and insulated from each other, adapted to engage with the studs on the bifurcated frames, whereby an electric current may be introduced through the electromagnets, and means for controlling the electric current, whereby said arms may be swung simultaneously, substantially as and for the purposes specified.

15. In a race course barrier and starting device, arms, a tape supported and guided by said arms, in which said arms are pivotally mounted, means for swinging said arms, brake drums journaled concentric to said arms and rigidly secured thereto, whereby they are adapted to rotate upon the swinging of the arms, lugs on the heads projecting over the brake drums, friction straps each having one of its ends secured to one of the lugs, brake levers pivotally mounted on the heads, adjustable links pivotally connecting the other ends of the friction straps to the brake levers, whereby when the outer ends of the brake levers are raised they will draw the frictional straps toward the brake drums to engage the frictional straps with the brake drums, and whereby when the outer ends of the brake levers are depressed they will disengage the friction straps from the brake drums, lugs on the heads with which the brake levers are adapted to engage to limit the depression of the outer ends of the brake levers, lugs on the inner ends of the brake levers for manually depressing the inner ends and raising the outer ends of the brake levers, and lugs on the arms adapted to engage with the brake levers near their outer ends, said lugs being yieldable upon their engagement with the brake levers when the arms swing downwardly past the brake levers, but being rigid upon their engagement with the brake levers when the arms swing upwardly past the brake levers, substantially as and for the purposes specified.

16. In a race course barrier and starting device, rigid arms, a tape supported and guided by said arms, a segmental gear on each arm, racks, slidably mounted, with which said segmental gears are adapted to engage, means for swinging said arms to resist the movement of the racks when the segmental gears engage with the racks, and means for restraining and releasing the arms, substantially as and for the purposes specified.

17. In a race course barrier and starting device, arms, pivotal supports therefor, a tape supported and guided by the arms, means for restraining and releasing the arms, gear teeth on the arms disposed concentrically of the pivotal support thereof, racks adapted to engage with the gear teeth, springs mounted adjacent to the racks, and means whereby the springs are compressed on the reciprocation of the racks in either direction, whereby said racks may alternately actuate said arms to swing them, and stop the swinging of said arms, substantially as and for the purposes specified.

18. In a race course barrier and starting device, arms, a tape supported and guided by said arms, sheaves over which the tape passes, studs on which the tape is frictionally secured near its ends, and weights movably suspended on the tape between the studs and the sheaves, adapted, when so suspended, to maintain the tension of the tape between the arms, and to maintain the frictional fastening of the tape on the studs, and adapted to be raised by the tape to release said tape from the studs, substantially as and for the purposes specified.

19. In a race course barrier and starting device, arms, a tape supported and guided by said arms, heads in which the arms are pivotally supported, means for swinging said arms upward, sheaves over which the tape passes, studs on which the tape is frictionally secured near its ends, weights movably suspended on said tape between the sheaves and the studs, adapted, when so suspended, to maintain the tension of the tape between the arms, and to maintain the frictional fastening of the tape on the studs, and adapted to be raised by the tape to release said tape from the studs, and projections on the heads adapted to engage the tape between the arms and the sheaves when the arms swing upward, to maintain the tape in position on the sheaves, substantially as and for the purposes specified.

20. In a race course barrier and starting device, arms, heads in which said arms are pivotally supported, posts, on which said heads are removably supported, means for swinging said arms, stirrups mounted on the posts below the heads, restraining and releasing devices comprising electro-magnets and arm restraining frames removably supported in the stirrups, wires forming the coils of the electro-magnets, studs forming the termini of the wires in the restraining and releasing devices, sockets in the stirrups, and tongues adjacent to the sockets adapted to be engaged by the studs on the restraining and releasing devices, and doors hinged on the stirrups adapted to prevent access to the sockets therein upon the removal of the restraining and releasing devices, substantially as and for the purposes specified.

JACOB PAWOLOWSKI.

Witnesses:
  JAMES N. RAMSEY,
  CLARENCE PERDEW.